(12) United States Patent
Young et al.

(10) Patent No.: US 6,543,233 B2
(45) Date of Patent: Apr. 8, 2003

(54) SLOT COOLED COMBUSTOR LINER

(75) Inventors: Craig Douglas Young, Maineville, OH (US); Ella Christine Kutter, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/783,278

(22) Filed: Feb. 9, 2001

(65) Prior Publication Data

US 2002/0108374 A1 Aug. 15, 2002

(51) Int. Cl.$^7$ .................................................. F23R 3/06
(52) U.S. Cl. ............................ 60/752; 60/755; 60/757
(58) Field of Search ........................... 60/752, 754, 755, 60/756, 757

(56) References Cited

U.S. PATENT DOCUMENTS

| | | | | |
|---|---|---|---|---|
| 2,547,619 A | * | 4/1951 | Buckland | 60/756 |
| 2,699,648 A | * | 1/1955 | Berkey | 60/757 |
| 3,572,031 A | * | 3/1971 | Szetela | 60/757 |
| 3,899,884 A | * | 8/1975 | Ekstedt | 60/751 |
| 3,930,369 A | * | 1/1976 | Verdouw | 60/39.23 |
| 4,151,713 A | * | 5/1979 | Faitani et al. | 60/757 |
| 4,733,538 A | * | 3/1988 | Vdoviak et al. | 60/752 |
| 5,209,067 A | * | 5/1993 | Barbier et al. | 60/757 |
| 6,260,359 B1 | * | 7/2001 | Monty et al. | 60/752 |

* cited by examiner

*Primary Examiner*—Ted Kim
(74) *Attorney, Agent, or Firm*—William Scott Andes; Pierce Atwood

(57) ABSTRACT

A combustor liner for use in a gas turbine engine includes a first annular panel section having a forward end, an aft end and a first cooling nugget located at the forward end thereof, and a second annular panel section having a forward end, an aft end and a second cooling nugget located at the forward end thereof. The second panel section is joined at its forward end to the aft end of the first panel section. A first row of cooling holes is located in the first cooling nugget, and a second row of cooling holes is located in the second cooling nugget. A group of dilution holes is located in the first panel section. The dilution holes are located at the aft end of the first panel section, immediately upstream of the second cooling nugget. Furthermore, each one of the dilution holes defines an aftmost edge, and all of the aftmost edges are axially aligned, even if the dilution holes have different hole diameters.

7 Claims, 3 Drawing Sheets

SLOT COOLED COMBUSTOR LINER

BACKGROUND OF THE INVENTION

This invention relates generally to gas turbine engines and more particularly to film cooled combustor liners used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners. The liners contain the combustion process and facilitate the distribution of air to the various combustor zones in prescribed amounts.

Because they are exposed to intense heat generated by the combustion process, combustor liners are cooled to meet life expectancy requirements. Liner cooling is commonly provided by diverting a portion of the compressed air (which is relatively cool) and causing it to flow over the outer surfaces of the liners. In addition, a thin layer of cooling air is provided along the combustion side of the liners by directing cooling air flow through cooling holes formed in the liners. This technique, referred to as film cooling, reduces the overall thermal load on the liners because the mass flow through the cooling holes dilutes the hot combustion gas next to the liner surfaces, and the flow through the holes provides convective cooling of the liner walls. There are two basic types of liners that employ film cooling: multi-hole cooled liners and slot cooled liners.

Multi-hole cooled liners include a large number of angled, very small cooling holes formed through the liners. Compressor air passes through the cooling holes to produce the film of cooling air on the combustion side of the liners. The cooling holes are generally distributed over the whole liner so as to provide a constant replenishing of the cooling film along the entire length of the liner. Slot cooled liners include a plurality of connected panel sections with a bump or nugget formed on the forward end of each panel section. An axially oriented slot is formed on the hot gas side surface of each panel section at the nugget, and a circumferentially disposed row of cooling holes is formed in the nugget. Compressor air passes through the cooling holes to produce the film of cooling air on the hot gas side surface of the panel section. Thus, the cooling film is replenished at each slot.

The distribution of air is accomplished through so-called dilution holes in the liners. The dilution holes introduce jets of air to the primary and secondary zones of the combustion chamber. The dilution air quenches the flames so as to control the gas temperature to which the turbine hardware downstream of the combustor will be exposed. The quenching also reduces the level of $NO_x$ emissions in the engine exhaust. It is common that different dilution holes have different sizes, depending on the amount of dilution air needed in a particular area of the combustion chamber. For slot cooled liners, dilution holes are currently located in a panel with the hole centers being axially aligned in a circumferential row, which is typically positioned mid-span of the panel. When there are different size dilution holes with this arrangement, the aft edges of the smaller diameter holes are located farther from the downstream slot that will replenish the cooling film.

The wake produced by the influx of air through the dilution holes will disrupt the cooling film. Hot combustion gases can become entrained in these wakes and significantly increase liner metal temperatures. Thus, while film cooling of combustor liners is generally quite effective, the presence of dilution holes can result in hot spots being formed immediately downstream thereof. As a result, current combustor liners can experience reduced low cycle fatigue life, increased oxidation rates of the substrate resulting in spallation of the thermal barrier coating, and accelerated creep of the slot overhangs.

Accordingly, there is a need for a slot cooled combustor liner in which the effect of the dilution holes on the film cooling effectiveness is minimized.

SUMMARY OF THE INVENTION

The above-mentioned need is met by the present invention which provides a gas turbine combustor liner that includes a first annular panel section having a forward end, an aft end and a first cooling nugget at the forward end thereof, and a second annular panel section having a forward end, an aft end and a second cooling nugget at the forward end thereof. The second panel section is joined at its forward end to the aft end of the first panel section. One or more rows of cooling holes are located in the first cooling nugget, and one or more rows of cooling holes are located in the second cooling nugget. A group of dilution holes is located in the first panel section. The dilution holes are located at the aft end of the first panel section, immediately upstream of the second cooling nugget. Furthermore, each one of the dilution holes defines an aftmost edge, and all of the aftmost edges are axially aligned, even if the dilution holes have different hole diameters.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
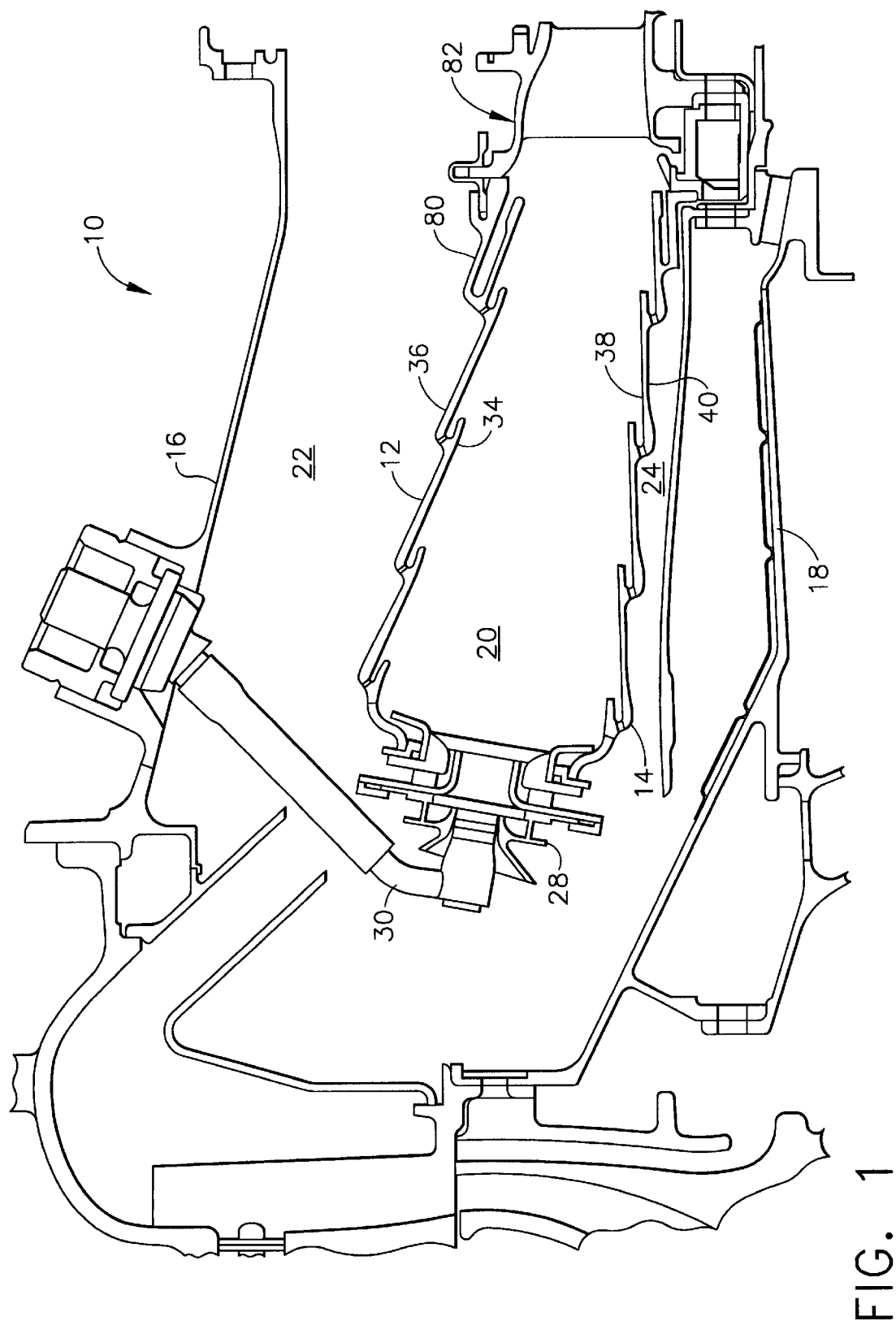
FIG. 1 is a longitudinal sectional view of a gas turbine combustor having the combustor liners of the present invention.

Referring to the drawings wherein identical reference numerals denote the same elements throughout the various views, FIG. 1 shows a combustor 10 of the type suitable for use in a gas turbine engine. The combustor 10 includes an annular outer liner 12 and an annular inner liner 14 disposed between an outer combustor casing 16 and an inner combustor casing 18. The outer and inner liners 12 and 14 are radially spaced from each other to define a combustion chamber 20. The outer liner 12 and the outer casing 16 form an outer passage 22 therebetween, and the inner liner 14 and the inner casing 18 form an inner passage 24 therebetween. As is known in the art, compressed air is supplied from a compressor (not shown) located upstream of the combustor 10. The compressed air passes principally into the combustor 10 to support combustion and partially into the outer and inner passages 22 and 24 where it is used to cool the liners 12 and 14 and turbomachinery further downstream.

A plurality of circumferentially spaced swirler assemblies 28 (only one shown in FIG. 1) is mounted at the upstream ends of the outer and inner liners 12 and 14. Each swirler assembly 28 receives compressed air from the compressor and fuel from a corresponding fuel tube 30. The fuel and air are swirled and mixed by swirler assemblies 28, and the resulting fuel/air mixture is discharged into combustion chamber 20. The fuel/air mixture is ignited by one or more igniters (not shown) that are disposed around the circumference of the outer liner 12. It is noted that although FIG. 1 illustrates one preferred embodiment of a single annular combustor, the present invention is equally applicable to any type of combustor, including double annular combustors, which uses slot cooled liners.

The outer and inner liners 12 and 14 each comprise a metal shell having a generally annular and axially extending configuration. Each shell includes a plurality of panel sections having cooling nuggets formed on the forward end thereof. The outer liner 12 has a hot side 34 facing the hot combustion gases in the combustion chamber 20 and a cold side 36 in contact with the relatively cool air in the outer passage 22. Similarly, the inner liner 14 has a hot side 38 facing the hot combustion gases in the combustion chamber 20 and a cold side 40 in contact with the relatively cool air in the inner passage 24.

Figure 2:
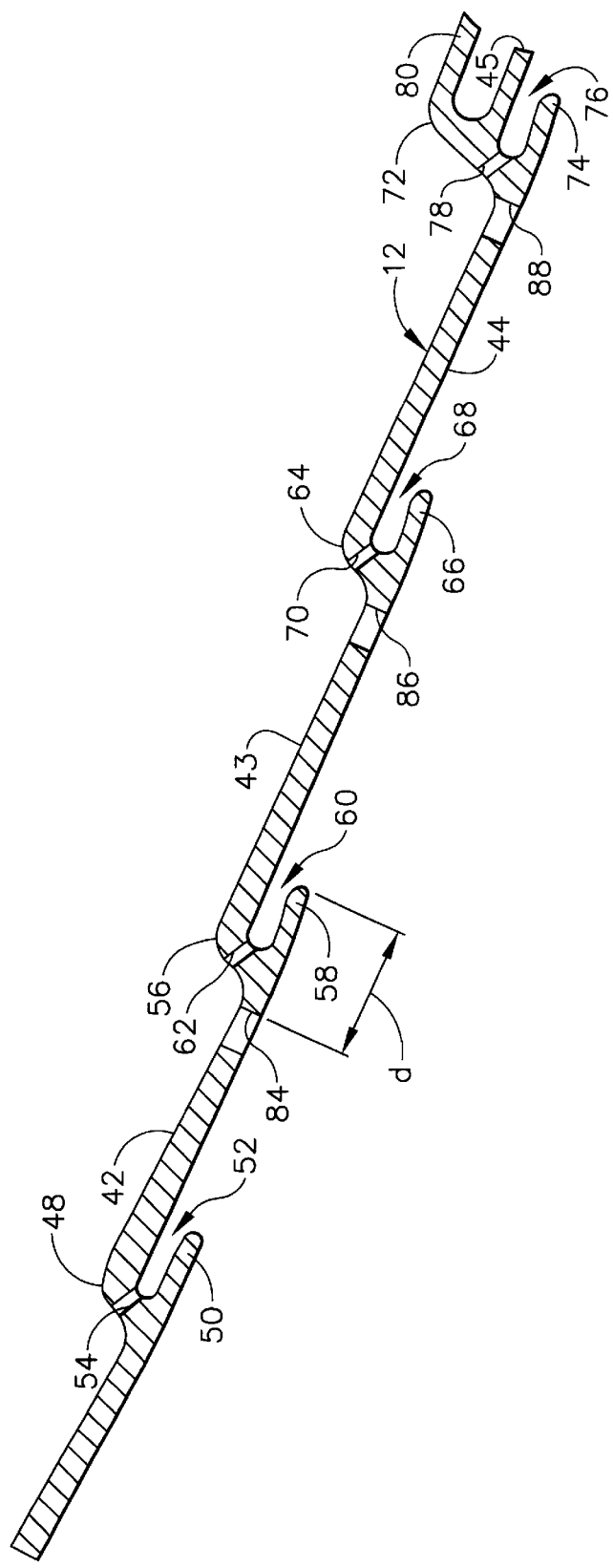
FIG. 2 is a sectional view of a portion of a combustor liner from FIG. 1.

Turning now to FIG. 2, the cooling scheme of the outer liner 12 is shown in more detail. The cooling scheme of the inner liner 14 is substantially the same as that of the outer liner and consequently is not described in detail here as the following description is essentially applicable to both liners. The outer liner 12 includes a first panel section 42, a second panel section 43, a third panel section 44, and a fourth panel section 45 (the fourth panel section 45 being shown only partially in FIG. 2). The panel sections 42–45 can be an integrally formed, machined forging or separate pieces of sheet metal joined together by a joining method such as brazing or welding. Each section 42–45 has a substantially annular configuration. It should be noted that the present invention is not limited to such a four-panel configuration, which is just described here by way of example. Indeed, the present invention is applicable to liners having different numbers of panels.

The first panel section 42 has a first cooling nugget 48 formed at the forward end thereof. The first cooling nugget 48 includes an annular lip 50 formed thereon and spaced radially inward so as to define a cooling slot 52. A row of cooling holes 54 is formed in the first cooling nugget 48 to feed cooling air to the first cooling slot 52. The first cooling slot 52 is oriented in a substantially axial direction so that cooling air is directed downstream and forms a thin cooling film on the combustion side of the first panel section 42. The first cooling holes 54 are distributed about the entire circumference of the cooling nugget 48 and are preferably equally spaced.

The second panel section 43 is joined at its forward end to the aft end of the first panel section 42. A second cooling nugget 56 is formed at the forward end of the second panel section 43. The second cooling nugget 56 includes an annular lip 58 formed thereon and spaced radially inward so as to define a cooling slot 60. A row of cooling holes 62 is formed in the second cooling nugget 56 to feed cooling air to the second cooling slot 60. The second cooling slot 60 is oriented in a substantially axial direction so that cooling air is directed downstream and forms a thin cooling film on the combustion side of the second panel section 43, thereby replenishing the cooling film from the first panel section 42. The axial cooling holes 62 are distributed about the entire circumference of the second cooling nugget 56 and are preferably equally spaced.

Similarly, the third panel section 44 is joined at its forward end to the aft end of the second panel section 43. A third cooling nugget 64 is formed at the forward end of the third panel section 44. The third cooling nugget 64 includes an annular lip 66 formed thereon and spaced radially inward so as to define a cooling slot 68. A row of cooling holes 70 is formed in the third cooling nugget 64 to feed cooling air to the third cooling slot 68. The third cooling slot 68 is oriented in a substantially axial direction so that cooling air is directed downstream and forms a thin cooling film on the combustion side of the third panel section 44, thereby replenishing the cooling film of the second panel section 43. The third cooling holes 70 are distributed about the entire circumference of the third cooling nugget 64 and are preferably equally spaced.

The fourth panel section 45 is joined at its forward end to the aft end of the third panel section 44. A fourth cooling nugget 72 is formed at the forward end of the fourth panel section 45. The fourth cooling nugget 72 includes an annular lip 74 formed thereon and spaced radially inward so as to define a cooling slot 76. A row of cooling holes 78 is formed in the fourth cooling nugget 72 to feed cooling air to the fourth cooling slot 76. As with the other panel sections, the fourth cooling slot 76 is oriented in a substantially axial direction so that cooling air is directed downstream and forms a thin cooling film on the combustion side of the fourth panel section 45, thereby replenishing the cooling film of the third panel section 44. The fourth cooling holes 78 are distributed about the entire circumference of the fourth cooling nugget 72 and are preferably equally spaced. As shown best in FIG. 1, the fourth panel section 45 includes a flange 80 that is connected at its aft end to the first stage turbine nozzle structure 82.

Figure 3:
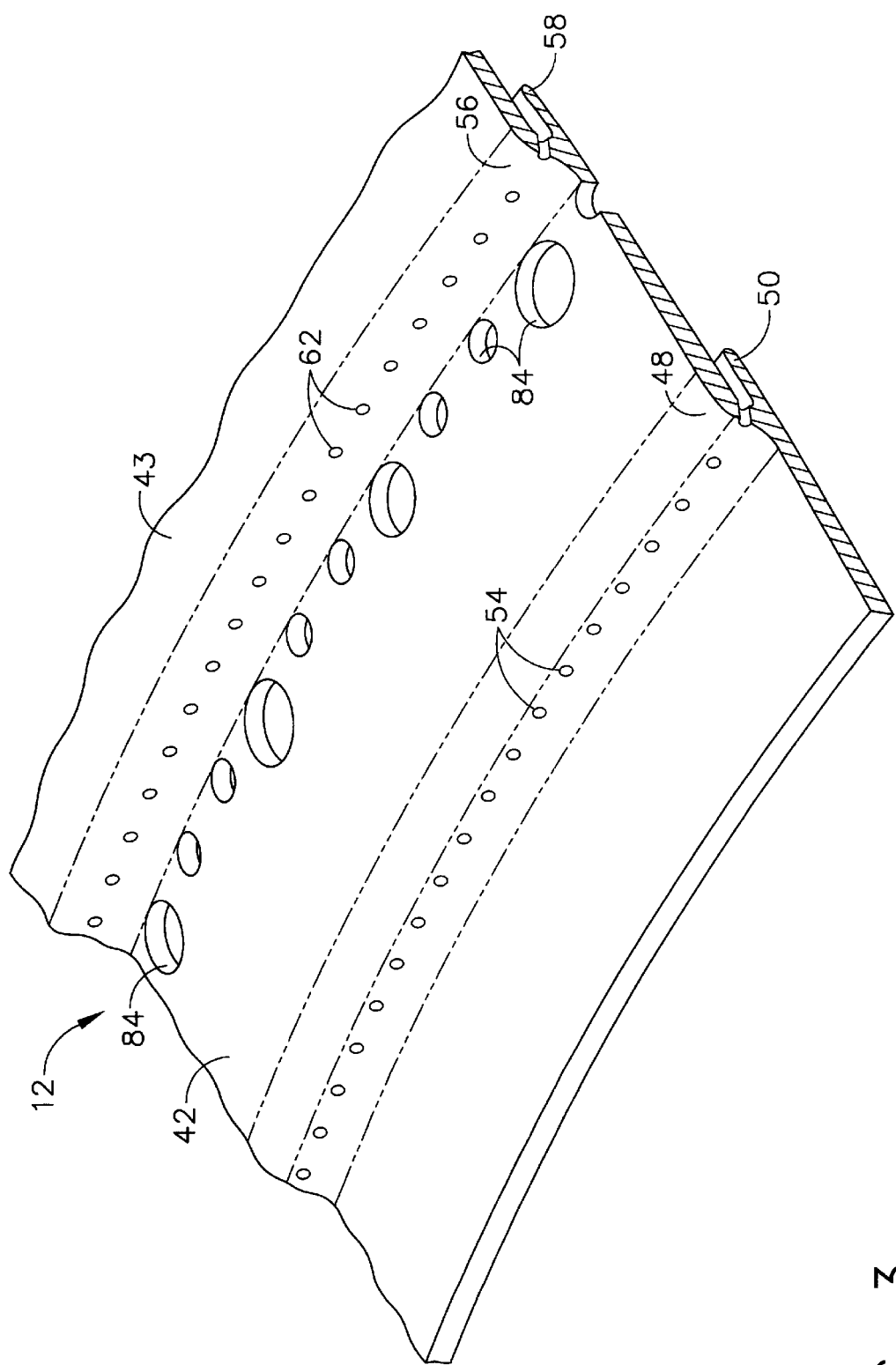
FIG. 3 is a fragmentary perspective view of a portion of the combustor liner of FIG. 2.

Referring now to FIG. 3 in addition to FIG. 2, a first group of circumferentially spaced dilution holes 84 is formed in the first panel section 42. The dilution holes 84 serve to admit dilution air into the combustor chamber 20 for enhancing the combustion process. Each dilution hole 84 has a diameter that is substantially greater than the diameter of each cooling hole 54, although all of the dilution holes 84 do not necessarily have the same diameter. That is, some dilution holes 84 have a larger diameter than others do, as shown in FIG. 3.

Each one of the dilution holes 84 is located at the aft end of the first panel section 42, immediately upstream of the second cooling nugget 56. Specifically, the dilution holes 84 are located as close as possible to the second cooling nugget 56, given the stress therein. This location minimizes the axial length, d, of the wake region behind each dilution hole 84 before the cooling film is replenished by the cooling air from the second cooling slot 60. Therefore, a very small length of the hot side of the liner 12 experiences cooling film disruption caused by the dilution hole air jets, and most of this length comprises the second lip 58 which is cooled on the other side by the cooling air from the second cooling holes 62. As a result, hot spots will be less likely to develop downstream of the dilution holes 84, and durability of the liner 12 will be improved. Furthermore, the aftmost edge of each dilution hole 84 is located at the aft end of the first panel section 42, regardless of the hole diameter, as seen in FIG. 3. That is, the aftmost edges, and not the hole centers, of the dilution holes 84 are axially aligned in a circumferential row. This means that the small diameter dilution holes 84 are the same distance from cooling film replenishment as the large diameter dilution holes 84 and will be no more susceptible to hot spots than the large diameter holes.

Additional groups of dilution holes 86 and 88 can be located in the second and third panel sections 43 and 44, respectively (FIG. 2). Like the first group of dilution holes 84, the dilution holes 86, 88 are located at the aft end of the second and third panels sections 43, 44, respectively, so as to provide a very short wake region. In each case, the aftmost edges of the dilution holes 86, 88 are axially aligned regardless of hole diameter.

The foregoing has described a combustor liner having improved cooling film effectiveness downstream of dilution holes. While specific embodiments of the present invention have been described, it will be apparent to those skilled in the art that various modifications thereto can be made without departing from the spirit and scope of the invention as defined in the appended claims.

What is claimed is:

1. A gas turbine combustor liner comprising:

a first annular panel section having a forward end and an aft end;

a second annular panel section having a forward end and an aft end, said second panel section being joined at its forward end to said aft end of said first panel section;

a group of dilution holes located in said first panel section, at least one of said dilution holes having a larger diameter than other ones of said dilution holes, wherein each one of said dilution holes defines an aftmost edge and all of said aftmost edges are axially aligned;

a third annular panel section having a forward end and an aft end, said third panel section being joined at its forward end to said aft end of said second panel section; and a second group of dilution holes located in said second panel section, at least one of said second dilution holes having a larger diameter than other ones of said second dilution holes, wherein each one of said second dilution holes defines an aftmost edge and all of said aftmost edges of said second dilution holes are axially aligned.

2. The liner of claim 1 wherein said dilution holes are located at said aft end of said first panel section.

3. The liner of claim 1 further comprising a cooling nugget located at said forward end of said second panel section and a row of cooling holes located in said cooling nugget, said dilution holes being located immediately upstream of said cooling nugget.

4. The liner of claim 3 wherein each one of said dilution holes has a larger diameter than any one of said cooling holes.

5. The liner of claim 1 wherein said second dilution holes are located at said aft end of said second panel section.

6. A gas turbine combustor liner comprising:

a first annular panel section having a forward end and an aft end and a first cooling nugget located at said forward end thereof;

a first row of cooling holes located in said first cooling nugget;

a second annular panel section having a forward end and an aft end and a second cooling nugget located at said forward end thereof, said second panel section being joined at its forward end to said aft end of said first panel section;

a second row of cooling holes located in said second cooling nugget;

a group of dilution holes located in said first panel section, said dilution holes being located at said aft end of said first panel section, immediately upstream of said second cooling nugget, wherein at least one of said dilution holes has a larger diameter than other ones of said dilution holes, and each one of said dilution holes defines an aftmost edge, and all of said aftmost edges are axially aligned;

a third annular panel section having a forward end and an aft end and a third cooling nugget located at said forward end thereof, said third panel section being joined at its forward end to said aft end of said second panel section; and a second group of dilution holes located in said second panel section, said second dilution holes being located at said aft end of said second panel section, immediately upstream of said third cooling nugget, wherein at least one of said second dilution holes has a larger diameter than other ones of said second dilution holes, and each one of said second dilution holes defines an aftmost edge, and all of said aftmost edges are axially aligned.

7. The liner of claim 6 wherein each one of said dilution holes has a larger diameter than any one of said cooling holes.

* * * * *